(12) United States Patent
Laake

(10) Patent No.: US 7,218,573 B1
(45) Date of Patent: May 15, 2007

(54) INTERPRETATION OF SHOT GATHER AND STACK OF SEISMIC DATA

(75) Inventor: Andreas W. Laake, Kingston (GB)

(73) Assignee: WesternGeco, L.L.C., Houston, TX (US)

( * ) Notice: Subject to any disclaimer, the term of this patent is extended or adjusted under 35 U.S.C. 154(b) by 0 days.

(21) Appl. No.: 11/327,145

(22) Filed: Jan. 6, 2006

(51) Int. Cl.
*G01V 1/00* (2006.01)
*G09G 5/02* (2006.01)

(52) U.S. Cl. .......................... 367/70; 345/603; 702/16
(58) Field of Classification Search ................ 367/70; 345/603; 702/16
See application file for complete search history.

(56) References Cited

U.S. PATENT DOCUMENTS

| | | | |
|---|---|---|---|
| 3,961,306 A | 6/1976 | Anstey | |
| 4,817,061 A | 3/1989 | Alford et al. | |
| 4,843,599 A | 6/1989 | Bucker | |
| 4,970,699 A * | 11/1990 | Bucker et al. | 367/70 |
| 5,930,730 A | 7/1999 | Marfurt et al. | |
| 6,571,177 B1 * | 5/2003 | Hardy | 702/16 |
| 2003/0214537 A1 | 11/2003 | Lynn | |
| 2005/0114034 A1 | 5/2005 | Bagaini | |

OTHER PUBLICATIONS

Taner et al (1979) : Taner, M., Koehler, F., and Sheriff, R.E., Complex seismic trace analysis, GEOPHYSICS 44(6), 1979, pp. 1041-1063.
Guevara et al (2001) *Geophone orientation versus event polarization on land multicomponent data*; Saul E. Guevara [Ecopetrol . ICP, Colombia] Robert R. Stewart [University of Calgary].

* cited by examiner

*Primary Examiner*—Mark Hellner

(57) ABSTRACT

Interpretation of a shot gather and a stack of seismic data. In one implementation, the shot gather is sorted into a first component shot gather, a second component shot gather and a third component shot gather. The first component shot gather is represented as a first subimage, the second component shot gather is represented as a second subimage, and the third component is represented as a third subimage. The first subimage is then merged with the second subimage and the third subimage to create a false color image. The shot gather of seismic traces may then be interpreted based on the false color image. The first component may by an x component, the second component may be a y component and the third component may be a z component. The first subimage may be a red or cyan subimage, the second subimage may be a green or yellow subimage and the third subimage may be a blue or magenta subimage.

21 Claims, 4 Drawing Sheets

INTERPRETATION OF SHOT GATHER AND STACK OF SEISMIC DATA

BACKGROUND

The following descriptions and examples are not admitted to be prior art by virtue of their inclusion within this section.

In a seismic survey, a source may be actuated to generate seismic energy, and the resultant seismic wavefield may be sampled by an array of seismic receivers disposed at a distance from the seismic source. Each receiver may be configured to acquire seismic data, which are normally in the form of a record or trace representing the value of some characteristic of the seismic wavefield against time. The acquired seismic data are a representation of the seismic wavefield at the receiver location. Information about the earth's sub-surface can be obtained from the acquired seismic data.

One well-known type of a seismic receiver is the seismic geophone. A geophone contains one or more sensors mounted in a casing. A geophone may be a single component geophone, which contains one sensor that records the component of the seismic wavefield parallel to a pre-determined direction. Information about the vertical component of the seismic wavefield may be obtained using a single component geophone oriented such that the sensing direction of the geophone is substantially vertical. Alternatively, a geophone may be a three-component geophone which includes three sensors oriented to record the components of the seismic wavefield in three orthogonal directions, which are typically denoted as x, y and z components.

Three-component seismic data are commonly displayed on three separate plots. Consequently, it is often difficult to jointly interpret all three components at the same time. However, joint interpretation of two components may be possible using hodogram displays, where the seismic data are windowed in time and offset, and both components are plotted in one display. The resulting ellipses may be analyzed for the length and orientation of their half axes to obtain information about the wave mode of the seismic data. This method, however, often results in substantial degradation of the temporal and spatial resolution of the result, due to its requirement of windowing the data.

SUMMARY

Described here are implementations of various technologies for interpreting a shot gather of seismic traces. In one implementation, the shot gather is sorted into a first component shot gather, a second component shot gather and a third component shot gather. The first component shot gather is represented as a first subimage, the second component shot gather is represented as a second subimage, and the third component is represented as a third subimage. The first subimage is then merged with the second subimage and the third subimage to create a false color image. The shot gather of seismic traces may then be interpreted based on the false color image. The first component may by an x component, the second component may be a y component and the third component may be a z component. The first subimage may be a red or cyan subimage, the second subimage may be a green or yellow subimage and the third subimage may be a blue or magenta subimage.

Described here are also implementations of various technologies for interpreting a stack of seismic data. In one implementation, the stack of seismic data is sorted into a stack of PP seismic data, a stack of PS radial seismic data and a stack of PS transverse seismic data. The stack of PP seismic data is represented as a first subimage, the stack of PS radial seismic data is represented as a second subimage, and the stack of PS transverse seismic data is represented as a third subimage. The first subimage is merged with the second subimage and the third subimage to create a false color image. The stack of seismic data is interpreted based on the false color image. The first subimage may be a red or cyan subimage, the second subimage may be a green or yellow subimage and the third subimage may be a blue or magenta subimage.

The claimed subject matter is not limited to implementations that solve any or all of the noted disadvantages. Further, the summary section is provided to introduce a selection of concepts in a simplified form that are further described below in the detailed description section. The summary section is not intended to identify key features or essential features of the claimed subject matter, nor is it intended to be used to limit the scope of the claimed subject matter.

BRIEF DESCRIPTION OF THE DRAWINGS

It is to be noted that the appended drawings illustrate only typical embodiments of this invention and are therefore not to be considered limiting of its scope, for the invention may admit to other equally effective embodiments.

DETAILED DESCRIPTION

Figure 1:
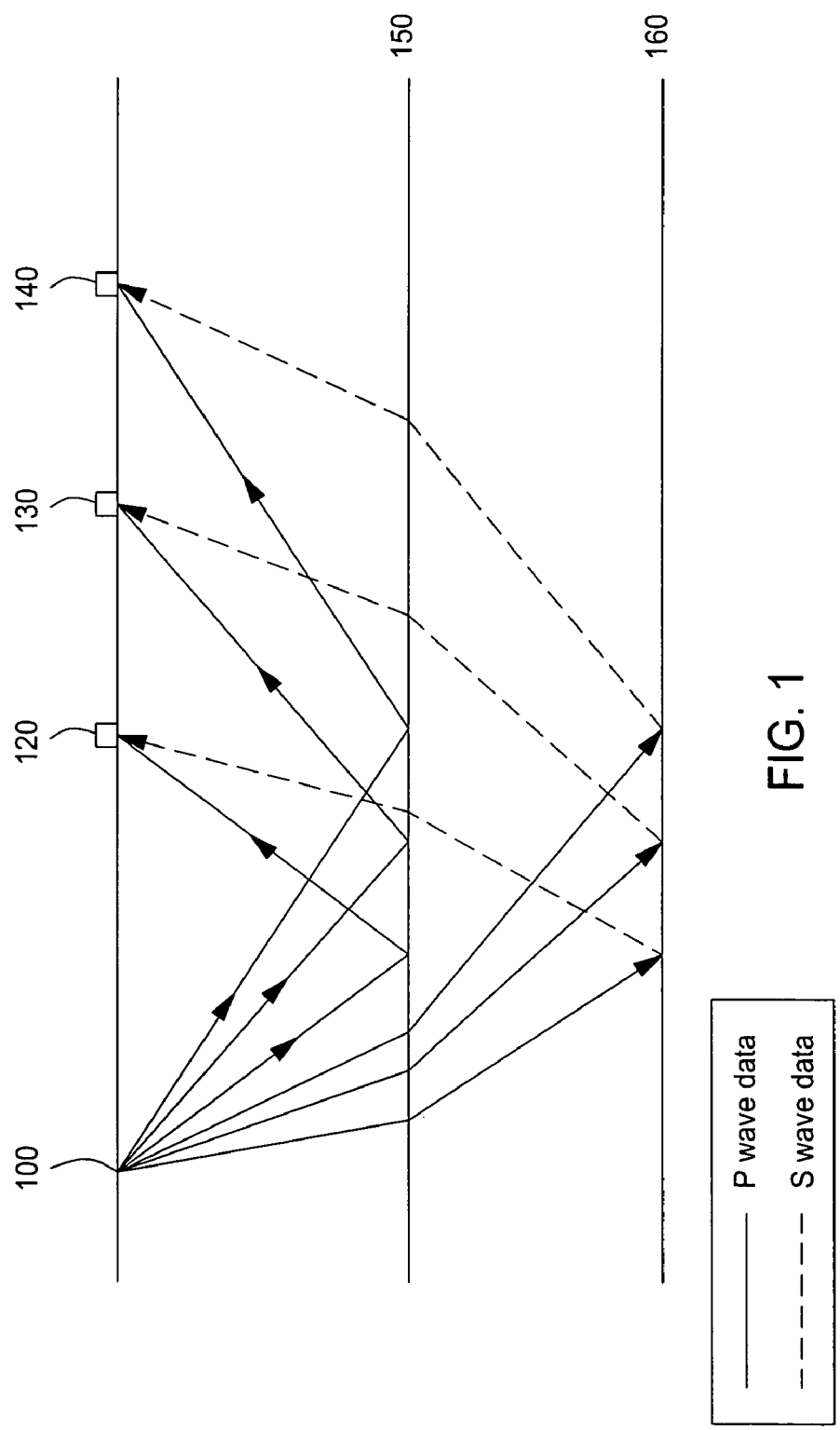
FIG. 1 illustrates a schematic diagram of a typical seismic survey in connection with implementations of various technologies described herein.

FIG. 1 illustrates a schematic diagram of a typical seismic survey in connection with implementations of various technologies described herein. A seismic survey is generally performed using at least one seismic source 100 and an array of seismic receivers 120, 130 and 140. For land seismic surveying, the seismic source 100 is typically at the surface or buried beneath the earth's surface and the seismic receivers 120, 130 and 140 are typically disposed on the earth's surface. For marine seismic surveying, the seismic source 100 is typically below the sea water level and the seismic receivers 120, 130 and 140 are typically disposed on the sea floor. When the source 100 is actuated, acoustic (or seismic) energy is emitted downwards into the earth and is reflected by geological interfaces that represent the change of rock (and pore fluid) elastic properties within the earth. The reflected energy may then be detected at the receivers 120, 130 and 140. The reflected energy may be recorded as a trace of at least one characteristic of a seismic wavefield as a function of time. An actuation of a seismic source may be known as a shot, and the set of traces recorded at the various receivers 120, 130 and 140 for one shot may commonly be referred to as a shot gather. Typically, several shots are fired during a seismic survey, making available a collection of several traces for each receiver location.

FIG. 1 also illustrates two geological structures 150 and 160 that act as reflectors of acoustic energy. These geological structures 150 and 160 may be formed by contrasting acoustic properties on both sides of the interfaces. As a result, the data acquired at each receiver 120, 130 and 140 contains the responses from one "event" corresponding to a reflection of acoustic energy at the interface 150 and another "event" corresponding to a reflection of acoustic energy at the interface 160. An event is generally defined as the recorded signals that are associated with a seismic wave recorded by the receiver.

Acoustic energy emitted by the seismic source 100 may predominantly be a pressure-wave (or P-wave). When the acoustic energy undergoes reflection an interface 150, 160, it may also undergo a partial mode conversion to a shear wave (S-wave). As a result, the seismic wavefield acquired at the receivers 120, 130 and 140 may therefore contain both pressure waves and shear waves.

Events arising from arrival of pressure waves are generally referred to as PP events, since they involve acoustic energy that is emitted as a pressure wave, reflected as a pressure wave by the geologic interfaces and recorded as a pressure wave. Events arising from arrival of shear waves are generally referred to as PS events, since they involve acoustic energy that is emitted as a pressure wave but underwent a mode conversion to a shear wave upon reflection and is therefore recorded on the receiver as a shear wave. PP events occur more prominently in vertical components of the acquired seismic data, whereas PS events appear more prominently in the horizontal components of the acquired seismic data. Where partial mode conversion occurs, the seismic energy reflected as a pressure wave gives rise to a PP event in the acquired seismic data and the seismic energy reflected as a shear wave (due to mode conversion) gives rise to a corresponding PS event in the acquired seismic data.

Figure 2:
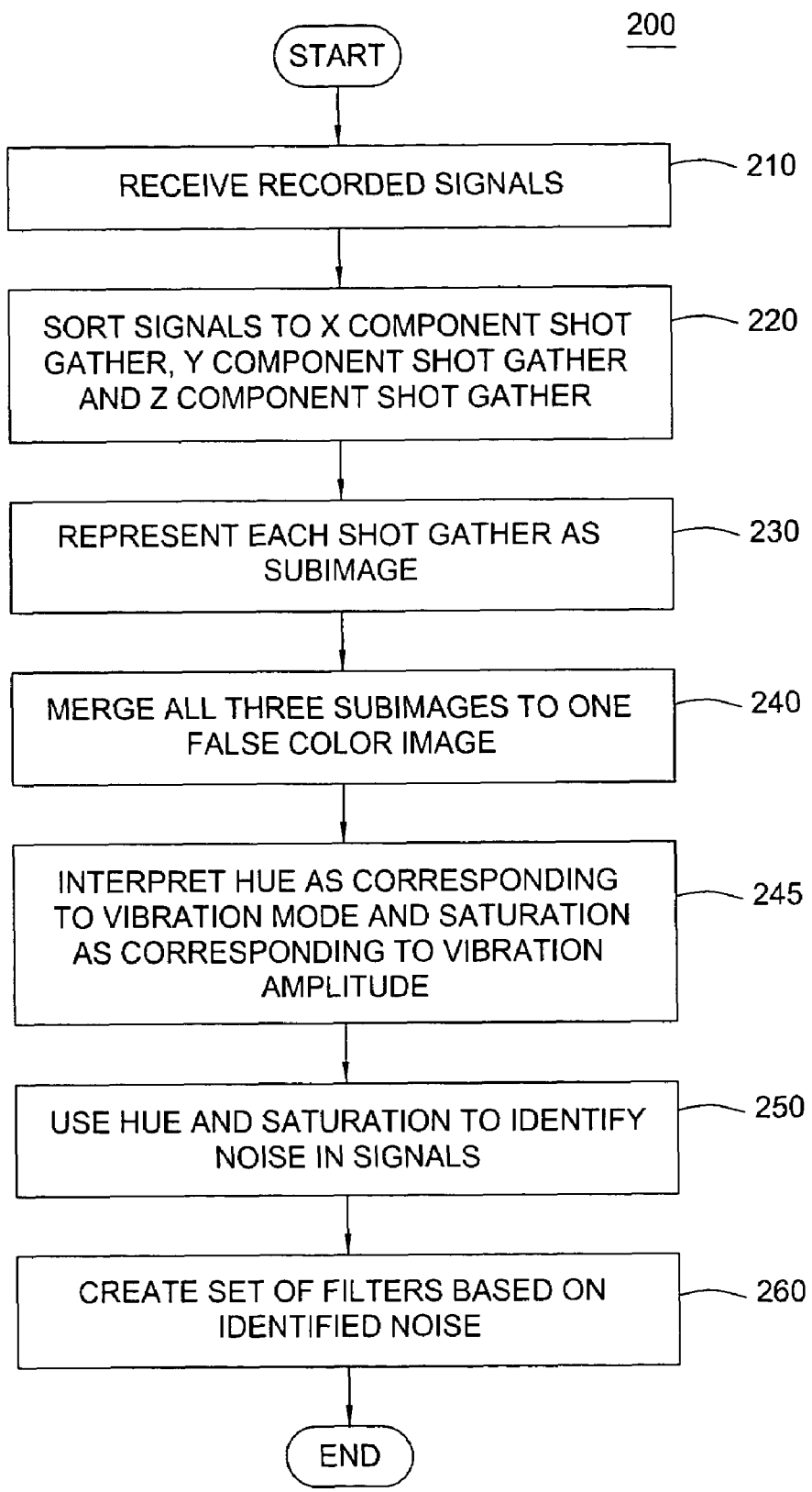
FIG. 2 illustrates a flow diagram of a method for interpreting a shot gather of multicomponent traces in accordance with implementations of various technologies described herein.

FIG. 2 illustrates a flow diagram of a method 200 for interpreting a shot gather of multicomponent traces in accordance with implementations of various technologies described herein. At step 210, the multicomponent traces or signals from one or more of vibration sensors are received. The signals may be any type of signals that may be generated from vibration sensors, including electromechanical signals, optical signals and the like. In one implementation, the signals represent traces. The vibration sensors may also be any type of vibration sensors that may be used to record signals in connection with seismic data processing, including velocity sensors, acceleration sensors and the like. The signals may include an x-component, i.e., signals in the x (in-line horizontal) direction, a y-component, i.e., signals in the y (cross-line horizontal) direction and a z-component, i.e., signals in the z (vertical) direction. Accordingly, the recorded signals may be sorted into an x-component shot gather, a y-component shot gather and a z-component shot gather (step 220).

At step 230, each shot gather is represented as a magnitude map, which represents the shot gather in two dimensional color plot, where the color saturation represents the instantaneous amplitude of each trace. The axis of the plot may be offset and time. In one implementation, the x-component shot gather is represented as a red subimage of the magnitude map, the y-component shot gather is represented as a green subimage of the magnitude map and the z-component shot gather is represented as a blue subimage of the magnitude map.

At step 240, all three subimages are merged to form a false color image, which may be defined as a color image composed of red, green and blue subimages, where the colors used in the image are not representative of natural colors of red, green and blue. The subimages may be merged by any merging technique, such as those used in digital photography or satellite image processing. In one implementation, the false color image is a joint photographic experts group (JPEG) image. In another implementation, the false color image is a tag image file format (TIFF) image.

The false color image may be characterized by hue, saturation and luminescence. The hue may be interpreted to correspond to the mode or orientation of the vibration, the saturation may be interpreted to correspond to the amplitude of the vibration and the luminescence may be interpreted to correspond to the polarity of the vibration (step 245). The mode of a three dimensional seismic wave may be determined by the plane in which the vibration oscillates. Compressional modes or pressure waves are distinguished from shear modes or shear waves. Pressure wave modes are characterized by the compressional motion of individual oscillators vibrating in the direction of the wave propagation. Shear wave modes are characterized by the transverse motion of individual oscillators, where the plane of vibration may be in any direction. The orientation of the shear wave mode is the plane defined by the combination of the X and Y components of the measured data.

As such, at step 250, the hue and saturation may be used to identify noise in the signals. For example, ground roll and other surface wave noise may be characterized by a combination of vertical (blue) and in-line horizontal (red) energy. Cross-line scattered noise may be characterized by a combination of vertical (blue) and cross-line horizontal (green) energy. In one implementation, if the hue of the event under investigation deviates from blue, then the event may be determined as noise. The saturation may be used to quantify the magnitude of the noise in connection with determining a signal-to-noise ratio. At step 260, the hue and saturation that correspond to the identified noise may be used create a set of filters to improve the signal to noise ratio during seismic data processing.

Figure 3:
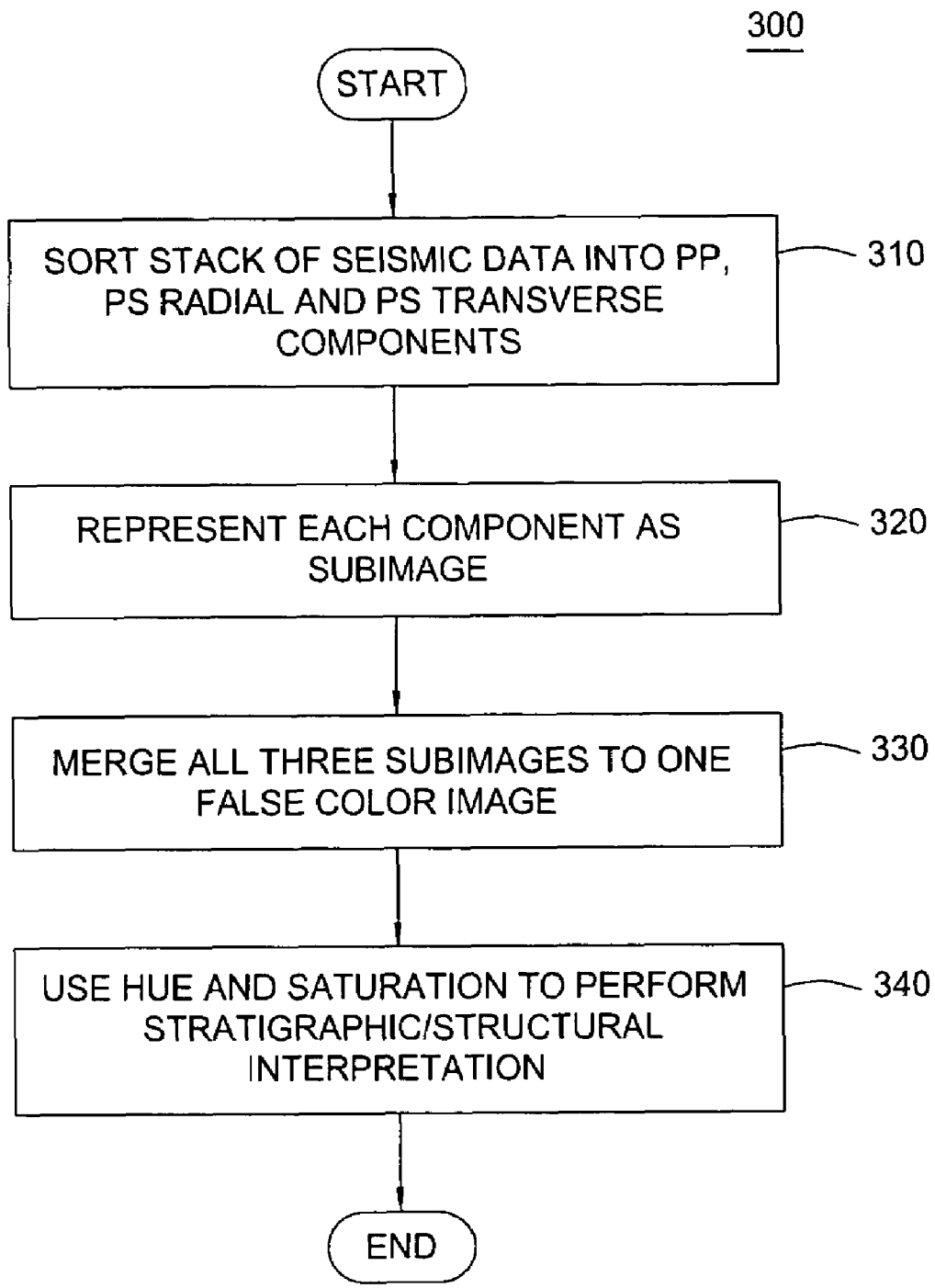
FIG. 3 illustrates a flow diagram of a method for interpreting a stack of seismic data in accordance with implementations of various technologies described herein.

FIG. 3 illustrates a flow diagram of a method 300 for interpreting a stack of seismic data in accordance with implementations of various technologies described herein. At step 310, the stack of seismic data is sorted into its PP, PS radial and PS transverse components. At step 320, each component is represented as a magnitude map. In one implementation, the PP component of the stack of seismic data is represented as a red subimage, the PS radial component of the stack of seismic data is represented as a green subimage and the PS transverse component of the stack of seismic data is represented as a blue subimage. At step 330, all three subimages are merged to form a false color image. The subimages may be merged by any merging technique, such as those used in digital photography or satellite image processing. In one implementation, the false color image is a JPEG image. In another implementation, the false color image is a TIFF image.

At step 340, the hue and saturation may be used to perform stratigraphic interpretation. In one implementation, the hue and saturation are used to identify various strata in a reservoir. Hue and saturation may be interpreted to correspond to different seismic wave modes, which correspond to different responses to changes in lithology of the geologic strata in the reservoir and overburden. Shear wave modes respond almost exclusively to rock matrix, because shear waves do not propagate in pore fluids. Pressure wave modes respond to the combination of rock matrix and pore fluid properties. PS wave responses may be interpreted as corresponding to rock matrix. PP wave responses may be interpreted as corresponding to pore fluid.

In another implementation, the hue and saturation are used to identify a reservoir delineation. As previously mentioned, the hue and saturation may be interpreted to correspond to different seismic wave modes. PP wave modes are known to suffer from substantial attenuation when gas is present in the formation, whereas PS wave modes pass through gas-charged areas mainly undisturbed. Using the properties of PS waves, the hue may be used to delineate a reservoir that would otherwise be hidden behind gas in PP wave mode data. The saturation may be used to determine the strength of PS impedance contrast, which measures the amount of change in the elastic parameters of the rock matrix. The combination of PP and PS data may be used to discriminate gas charged elastic layers from gas-free zones using PP data to map areas suspected to contain gas and PS data to confirm that the rock matrix stays the same. If the PS data show a change, then the PS data would be interpreted for lithology change instead of gas charge.

Figure 4:
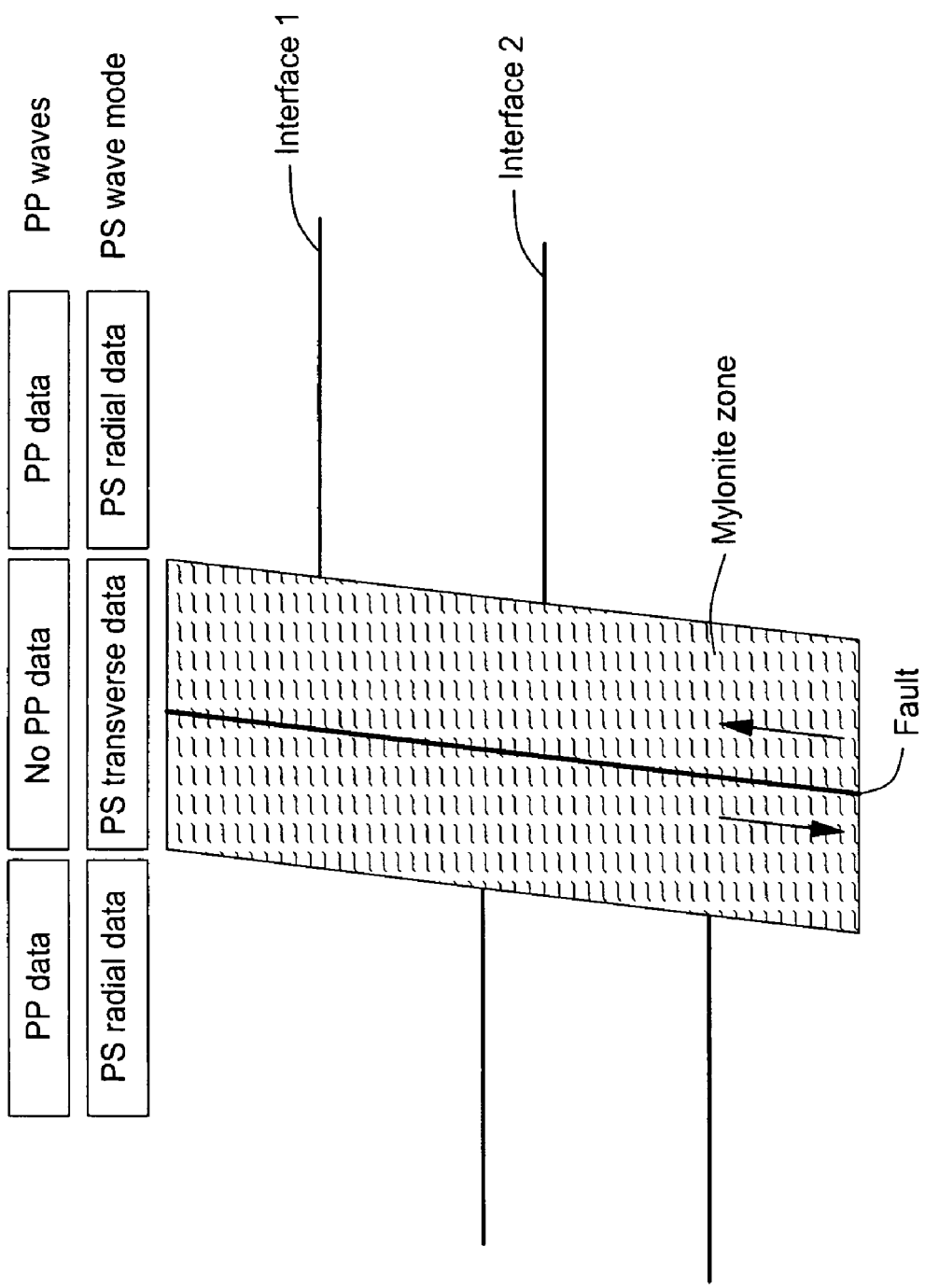
FIG. 4 illustrates a schematic diagram of fault zone identification using implementations of various technologies described herein.

The hue and saturation may also be used to perform structural interpretation. In one implementation, the hue and saturation are used to identify a fault zone. In the vicinity of faults, a zone of the rock structure may be destroyed, and such zone may commonly be referred to as mylonite. Pressure waves respond to this change in rock structure by dimming the reflector intensity, since the impedance contrast along the strata is blurred by the fault. On the other hand, shear waves are highly sensitive to rock matrix changes. Due to this high sensitivity, shear waves detect the mylonite zone as a separate elastic feature. When shear waves detect the mylonite zone, the shear wave radial energy changes to the shear wave transverse energy, as shown in FIG. 4. This change in energy may be displayed in the false color image as a change in hue.

In another implementation, the hue and saturation are used to identify anisotropy in a reservoir. The strong dependence of shear wave propagation on the rock properties leads to a strong dependence of the shear wave velocity from the rock matrix elastic properties. If the structure of a rock matrix has a preferred orientation, then the propagation of the shear waves may also reflect this orientation, which is a phenomenon known as anisotropy. Anisotropy is generally indicative of the preferred directions of fluid flow in a reservoir, and is thus an important factor for the planning of the fluid extraction process during production. Anisotropy may be detected if the arrival times of the radial and transverse PS modes are different. As such, anisotropy may be detected in a false color image by the varying arrival times in the radial and transverse motions. The hue may be used to discriminate between radial and transverse modes and the saturation may be used to determine the phase and magnitude of the wave modes.

While the foregoing is directed to embodiments of the present invention, other and further embodiments of the invention may be devised without departing from the basic scope thereof, and the scope thereof is determined by the claims that follow. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for displaying a shot gather of seismic traces, comprising:
    sorting the shot gather into a first component shot gather, a second component shot gather and a third component shot gather;
    representing the first component shot gather as a first subimage, the second component shot gather as a second subimage and the third component as a third subimage;
    merging the first subimage with the second subimage and the third subimage to create a false color image characterized by hue, saturation and luminescence, wherein the hue is indicative of one or more modes of vibrations from which the shot gather is generated, the saturation is indicative of one or more amplitudes of vibrations from which the shot gather is generated and the luminescence is indicative of the polarity of the vibrations.

2. A method for displaying a stack of seismic data, comprising:
    sorting the stack of seismic data into a stack of PP seismic data, a stack of PS radial seismic data and a stack of PS transverse seismic data;
    representing the stack of PP seismic data as a first subimage, the stack of PS radial seismic data as a second subimage and the stack of PS transverse seismic data as a third subimage;
    merging the first subimage with the second subimage and the third subimage to create a false color image characterized by hue and saturation, wherein the hue and saturation are indicative of one or more seismic wave modes corresponding to one or more responses to changes in lithology of a geologic strata in a reservoir.

3. A method for identifying a fault zone, comprising:
    sorting a stack of seismic data into a stack of PP seismic data, a stack of PS radial seismic data and a stack of PS transverse seismic data;
    representing the stack of PP seismic data as a first subimage, the stack of PS radial seismic data as a second subimage and the stack of PS transverse seismic data as a third subimage;
    merging the first subimage with the second subimage and the third subimage to create a false color image characterized by hue, wherein a change in the hue is indicative of a change in energy from shear wave radial energy to shear wave transverse energy; and
    identifying the fault zone based on the change in the hue.

4. The method of claim 1, wherein the hue and the saturation are indicative of noise in the shot gather.

5. The method of claim 1, wherein the first component is an x component, the second component is a y component and the third component is a z component.

6. The method of claim 1, wherein the first subimage is a red subimage, the second subimage is a green subimage and the third subimage is a blue subimage.

7. The method of claim 1, wherein the first subimage is a cyan subimage, the second subimage is a yellow subimage and the third subimage is a magenta subimage.

8. The method of claim 4, further comprising creating a set of filters based on the identified noise.

9. The method of claim 8, wherein the set of filters is configured to improve the signal to noise ratio during seismic data processing.

10. The method of claim 1, wherein the false color image is a JPEG image.

11. The method of claim 1, wherein the false color image is a TIFF image.

12. The method of claim 2, wherein the first subimage is a red subimage, the second subimage is a green subimage and the third subimage is a blue subimage.

13. The method of claim 2, wherein the first subimage is a cyan subimage, the second subimage is a yellow subimage and the third subimage is a magenta subimage.

14. The method of claim 1, wherein a combination of blue vertical and red in-line horizontal energy lines in the false color image is indicative of at least one of ground roll and surface wave noise.

15. The method of claim 1, wherein a combination of blue vertical and green cross-line horizontal energy lines in the false color image is indicative of cross-line scattered noise.

16. The method of claim 1, wherein a deviation from blue is indicative of noise in the shot gather.

17. The method of claim 2, wherein a change in hue is indicative of a change in PS wave modes corresponding to a change in lithology.

18. The method of claim 2, wherein the saturation is indicative of the strength of PS impedance constrast.

19. The method of claim 2, wherein a change in hue is indicative of a change from shear wave radial energy to shear wave transverse energy corresponding to a fault zone.

20. The method of claim 2, wherein the hue is indicative of the variation between radial and transverse wave modes.

21. The method of claim 2, wherein the saturation is indicative of the phase and magnitude of the seismic wave modes.

* * * * *